US011280984B2

United States Patent
Yang

(10) Patent No.: US 11,280,984 B2
(45) Date of Patent: Mar. 22, 2022

(54) REFLECTIVE CAMERA AND ELECTRONIC DEVICE

(71) Applicant: GUANGDONG OPPO MOBILE TELECOMMUNICATIONS CORP., LTD., Guangdong (CN)

(72) Inventor: Xin Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/934,841

(22) Filed: Jul. 21, 2020

(65) Prior Publication Data

US 2021/0096337 A1 Apr. 1, 2021

(30) Foreign Application Priority Data

Sep. 27, 2019 (CN) .......................... 201910925993.6

(51) Int. Cl.
*H04N 5/225* (2006.01)
*G02B 13/00* (2006.01)

(52) U.S. Cl.
CPC ....... *G02B 13/0065* (2013.01); *H04N 5/2252* (2013.01); *H04N 5/2254* (2013.01)

(58) Field of Classification Search
CPC ............ G02B 13/0065; G02B 26/0825; G02B 17/0808; G02B 3/14; G02B 13/0075; G02B 17/0896; G02B 13/009; H04N 5/2252; H04N 5/2254; G02F 1/139
See application file for complete search history.

(56) References Cited

U.S. PATENT DOCUMENTS

| 5,940,222 | A | 8/1999 | Sinclair et al. |
| 6,547,406 | B1 | 4/2003 | Greenaway et al. |
| 10,133,043 | B1 | 11/2018 | Lu |
| 2007/0139751 | A1* | 6/2007 | Kuiper ............... G02B 26/0825 359/846 |

(Continued)

FOREIGN PATENT DOCUMENTS

| CN | 101017310 A | 8/2007 |
| CN | 101498823 A | 8/2009 |
| CN | 102866488 A | 1/2013 |

(Continued)

OTHER PUBLICATIONS

China First Office Action with English Translation for CN Application 201910925993.6 dated Mar. 19, 2021.

(Continued)

*Primary Examiner* — Mekonnen D Dagnew
(74) *Attorney, Agent, or Firm* — Young Basile Hanlon & MacFarlane, P.C.

(57) ABSTRACT

A reflective camera and an electronic device are provided. The reflective camera includes a first mirror, a second mirror and an imaging detector. The first mirror is provided with a through hole and configured to reflect an incident light. The second mirror is arranged on a first side of the first mirror, and configured to reflect the incident light reflected by the first mirror. The imaging detector is arranged on a second side of the first mirror, and configured to receive the incident light reflected by the second mirror through the through hole, and further to convert the incident light into an electrical signal for imaging.

17 Claims, 5 Drawing Sheets

(56) References Cited

U.S. PATENT DOCUMENTS

| 2015/0146278 A1* | 5/2015 | Thomas | G02B 21/0076 |
| | | | 359/292 |
| 2019/0187446 A1 | 6/2019 | Dai et al. | |

FOREIGN PATENT DOCUMENTS

| CN | 103345051 A | 10/2013 |
|---|---|---|
| CN | 103415806 A | 11/2013 |
| CN | 103777350 A | 5/2014 |
| CN | 105824095 A | 8/2016 |
| CN | 105849613 A | 8/2016 |
| CN | 106537214 A | 3/2017 |
| CN | 108490631 A | 9/2018 |
| CN | 109194859 A | 1/2019 |
| CN | 208401984 U | 1/2019 |
| CN | 109557649 A | 4/2019 |
| CN | 110196488 A | 9/2019 |
| CN | 110646932 A | 1/2020 |
| JP | 2002122784 A | 4/2002 |
| JP | 2004179736 A | 6/2004 |
| JP | 2018109673 A | 7/2018 |
| WO | 2012108137 A1 | 8/2012 |

OTHER PUBLICATIONS

ISR for PCT application PCT/CN2020/116412 dated Dec. 21, 2020.
Extended European Search Report for EP application 20194996.3 dated Feb. 12, 2021.
Chinese Second Office Action with English Translation for CN Application 201910925993.6 dated Oct. 20, 2021. (12 pages).
Indian Examination Report for IN Application 202014038300 dated Aug. 11, 2021. (6 pages).

* cited by examiner

REFLECTIVE CAMERA AND ELECTRONIC DEVICE

CROSS-REFERENCE TO RELATED APPLICATION(S)

This application claims priority to and benefit of Chinese Patent Application Serial No. 201910925993.6, filed on Sep. 27, 2019. The entire content of the before-mentioned patent application is incorporated by reference as part of the disclosure of this U.S. application.

TECHNICAL FIELD

The present disclosure relates to a technical field of optical imaging, and more particularly to a reflective camera and an electronic device.

BACKGROUND

The conventional auto-focus technology is achieved by moving a lens forward and backward via a voice coil motor to change a distance between the lens and a detector. However, with improvements of a focal length and a pixel of a camera module, a volume of the lens increases. Accordingly, a volume and a weight of the voice coil motor also increase, thus leading to an increase in a thickness of the overall camera module.

SUMMARY

Embodiments of the present disclosure provide a reflective camera and an electronic device.

The reflective camera according to a first aspect of embodiments of the present disclosure includes a first mirror, a second mirror, and an imaging detector. The first mirror is provided with a through hole and configured to reflect an incident light. The second mirror is arranged on a first side of the first mirror, and configured to reflect the incident light reflected by the first mirror. The imaging detector is arranged on a second side of the first mirror, and configured to receive the incident light reflected by the second mirror through the through hole, and further to convert the incident light into an electrical signal for imaging.

The electronic device according to a second aspect of the embodiments of the present disclosure includes a housing and a reflective camera, and the reflective camera is joined with the housing. The reflective camera includes a first mirror, a second mirror, and an imaging detector. The first mirror is provided with a through hole and configured to reflect an incident light. The second mirror is arranged on a first side of the first mirror, and configured to reflect the incident light reflected by the first mirror. The imaging detector is arranged on a second side of the first mirror, and configured to receive the incident light reflected by the second mirror through the through hole, and further to convert the incident light into an electrical signal for imaging.

The reflective camera according to a third aspect of embodiments of the present disclosure includes a first mirror, a second mirror, and an imaging detector. The first mirror is provided with a through hole and has a concave object-side surface. The second mirror is arranged on an object side of the first mirror, and has a convex image-side surface opposite to the concave object-side surface of the first mirror. The imaging detector is arranged on an image side of the first mirror, and configured to receive an incident light reflected by the first mirror and the second mirror via the through hole, and further to convert the incident light into an electrical signal for imaging. The reflective camera is configured to focus by changing a focal length of at least one of the first mirror and the second mirror.

Additional aspects and advantages of the embodiments of present disclosure will be given in part in the following descriptions, become apparent in part from the following descriptions, or be learned from the practice of the embodiments of the present disclosure.

BRIEF DESCRIPTION OF DRAWINGS

These and other aspects and advantages of the embodiments of the present disclosure will become apparent and readily appreciated from the following descriptions made with reference to the drawings.

DETAILED DESCRIPTION

Embodiments of the present disclosure are further described below. Examples of the embodiments are illustrated in the accompanying drawings. Same or similar reference signs represent the same or similar components or components that have the same or similar functions from beginning to end. The embodiments described below with reference to the accompanying drawings are examples, are merely used to explain the present disclosure, and cannot be construed as a limitation to the present disclosure.

Figure 1:
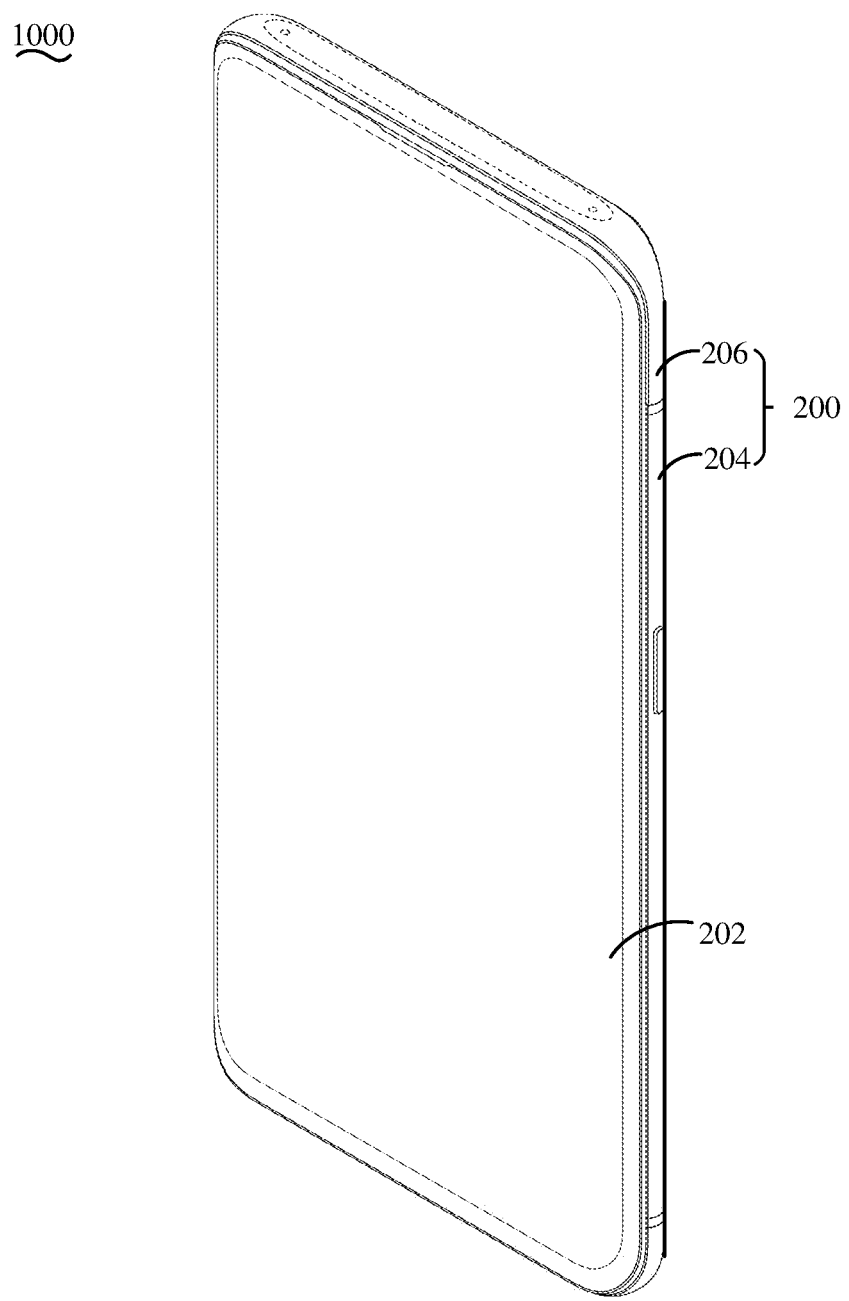
FIG. 1 is a perspective view of an electronic device in a state according to some embodiments of the present disclosure.
Figure 2:
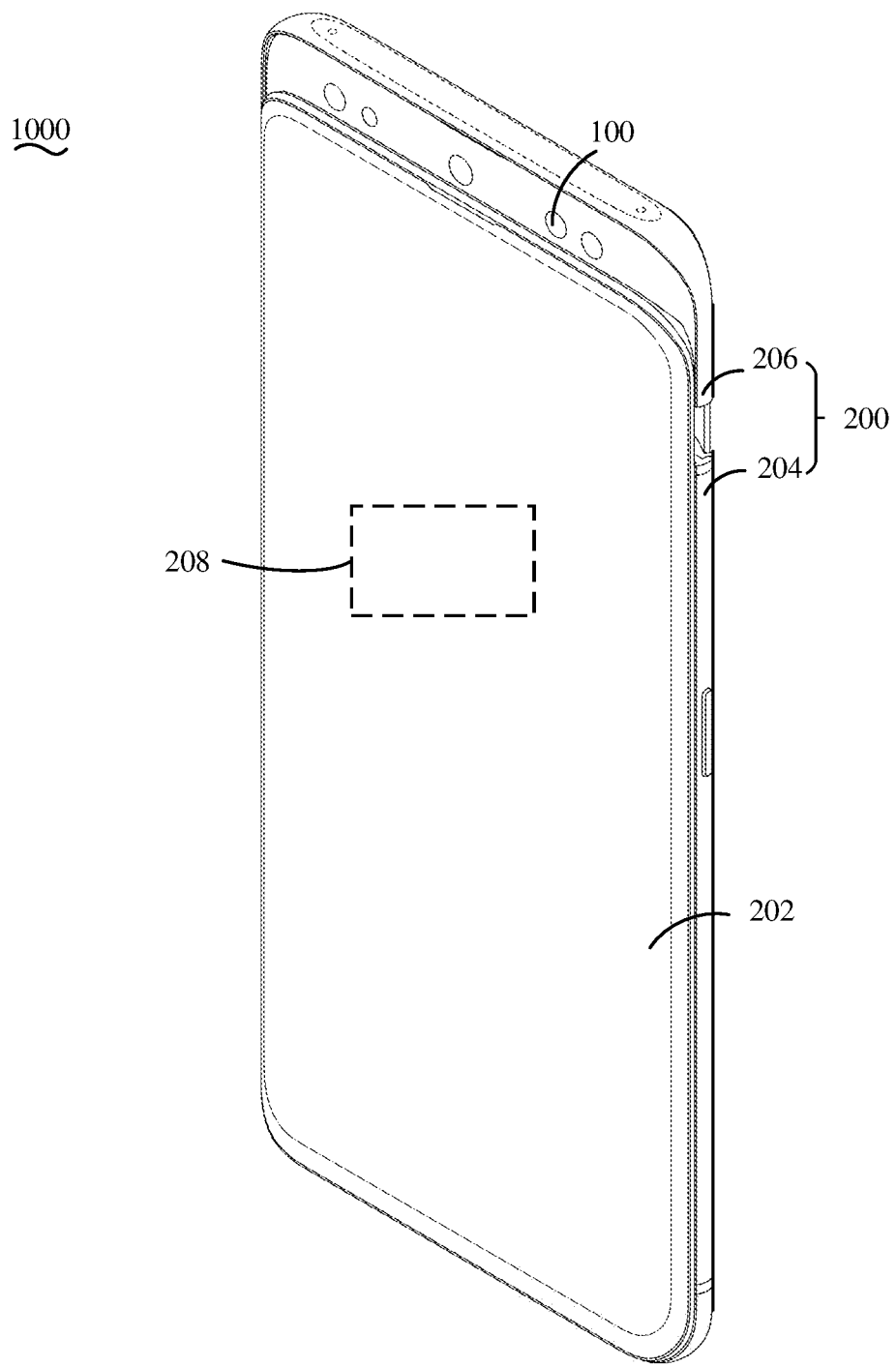
FIG. 2 is a perspective view of an electronic device in another state according to some embodiments of the present disclosure.

As illustrated in FIG. 1 and FIG. 2, an electronic device 1000 according to embodiments of the present disclosure includes a housing 200 and a reflective camera 100. The electronic device 1000 may be a mobile phone, a tablet computer, a notebook computer, a game machine, a smart watch, a smart bracelet, a head-mounted display device, an unmanned aerial vehicle, a digital still camera (DSC), a digital video camcorder (DVC), a monitoring device such as a driving recorder, and other electronic devices with a camera or a video camcorder. The embodiments of the present disclosure are illustrated by taking an example that the electronic device 1000 is a mobile phone. It may be understood that the specific form of the electronic device 1000 is not limited to the mobile phone.

The housing 200 may be configured as a mounting carrier for a functional element of the electronic device 1000. The housing 200 may provide the functional element with protections against dust, drop, water, etc., and the functional element may be a display screen 202, a processing chip 208, a receiver, etc. In the embodiment of the present disclosure, the housing 200 includes a main body 204 and a movable bracket 206 configured to move relative to the main body 204 driven by a driving device. For example, the movable bracket 206 may slide relative to the main body 204 so as to slide into the main body 204 (as illustrated in FIG. 1) or out of the main body 204 (as illustrated in FIG. 2). Some functional elements (such as the display screen 202) may be mounted to the main body 204, and other functional elements (such as the reflective camera 100, the receiver) may be mounted to the movable bracket 206. The movement of the movable bracket 206 may drive the other functional elements to retract into the main body 204 or extend out of the main body 204. Of course, what illustrated in FIG. 1 and FIG. 2 is merely an example of a specific form of the housing 200, and cannot be construed as a limitation of the housing 200 of the present disclosure.

The reflective camera 100 is joined with the housing 200. The reflective camera 100 may be mounted to the housing 200. In some embodiments, the reflective camera 100 may be mounted to the movable bracket 206. When the user needs to use the reflective camera 100, the movable bracket 206 may be triggered to slide out of the main body 204 to drive the reflective camera 100 to extend out of the main body 204. When the user does not need to use the reflective camera 100, the movable bracket 206 may be triggered to slide into the main body 204 to drive the reflective camera 100 to retract into the main body 204. In other embodiments, a light transmission hole is formed in the housing 200, and the reflective camera 100 is immovably arranged in the housing 200 and corresponds to the light transmission hole so as to collect image information. In this case, the reflective camera 100 may be a front camera or a rear camera. Or, the display screen 202 may be provided with a light transmission hole, and the reflective camera 100 may be arranged below the display screen 202 and correspond to the light transmission hole so as to collect image information.

Figure 3:
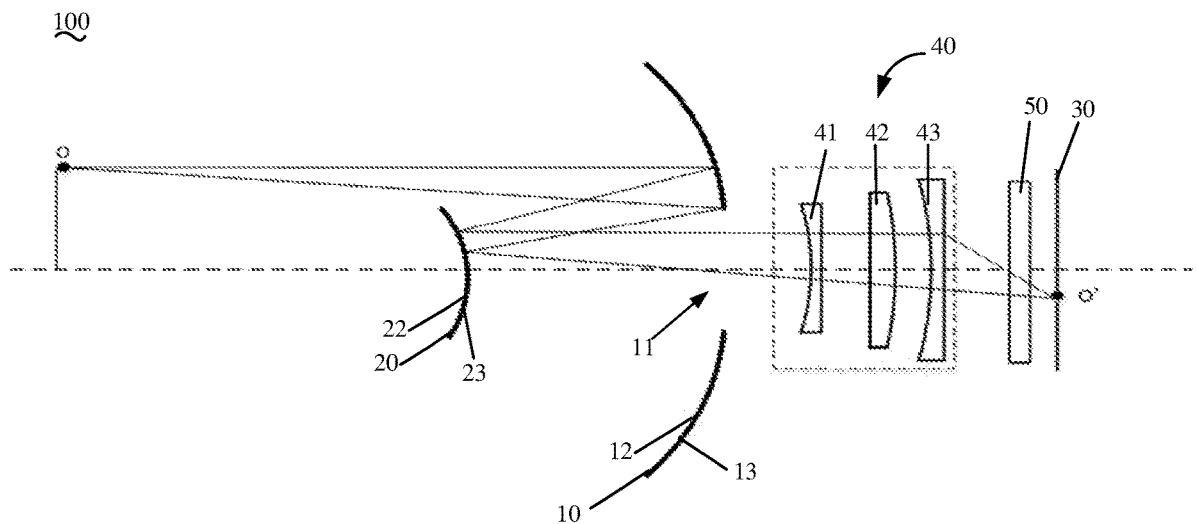
FIG. 3 is a schematic view of a planar light path of a reflective camera according to some embodiments of the present disclosure.

As illustrated in FIG. 3, the reflective camera 100 includes a first mirror 10, a second mirror 20, and an imaging detector 30. The first mirror 10 is provided with a through hole 11. An incident light emitted from an object point O is incident on the first mirror 10 and then reflected by the first mirror 10. The incident light reflected by the first mirror 10 is incident on the second mirror 20 and reflected by the second mirror 20. The incident light reflected by the second mirror 20 passes through the through hole 11 and converges to the imaging detector 30, thus resulting in an image point O'. The imaging detector 30 is configured to convert the converged light into an electrical signal for imaging.

The first mirror 10 includes a first object-side surface 12 and a first image-side surface 13 facing away from each other, and the first object-side surface 12 is a concave surface. The first object-side surface 12 is configured to reflect the incident light incident on the first mirror 10 from outside. The first object-side surface 12 may be any one of a paraboloid, a spherical surface, an ellipsoid or a hyperboloid. When the first object-side surface 12 is the paraboloid, the spherical surface, the ellipsoid or the hyperboloid, an imaging aberration of the reflective camera 100 can be effectively optimized, thus improving the imaging quality.

Further, when the first object-side surface 12 is the paraboloid, since the paraboloid is a quadric surface, the imaging aberration of the reflective camera 100 can be further optimized, and the aberration of the reflective camera 100 itself can be corrected, thus improving the imaging quality significantly.

The second mirror 20 includes a second object-side surface 22 and a second image-side surface 23 facing away from each other, and the second image-side surface 23 is a convex surface. The first object-side surface 12 is opposite to the second image-side surface 23. The second image-side surface 23 is configured to reflect the incident light reflected by the first object-side surface 12 to the second image-side surface 23. The second image-side surface 23 may be any one of a paraboloid, a spherical surface, an ellipsoid or a hyperboloid. When the second image-side surface 23 is the paraboloid, the spherical surface, the ellipsoid or the hyperboloid, the imaging aberration of the reflective camera 100 can be effectively optimized, thus improving the imaging quality. Further, when the second image-side surface 23 is the paraboloid, since the paraboloid is a quadric surface, the imaging aberration of the reflective camera 100 can be further optimized, and the aberration of the reflective camera 100 itself can be corrected, thus improving the imaging quality significantly. In addition, the first object-side surface 12 and the second image-side surface 23 are opposite to each other, which is conducive to forming a reflection light path between the first object-side surface 12 and the second image-side surface 23, and folding the incident light, so as to achieve the miniaturization of the reflective camera 100.

The second mirror 20 is arranged on an object side of the first mirror 10. The incident light is sequentially incident on the first mirror 10, the second mirror 20 and the imaging detector 30, thus effectively reducing a total length of the reflective camera 100.

The first mirror 10 and the second mirror 20 may be made of carborundum or an alternative material with a small thermal distortion, a close-to-zero expansion and a high specific stiffness suitable for space, such as an ultra-low expansion (ULE) glass cavity and a ZERODO material, thus facilitating a lightweight design of the reflective camera 100.

The first mirror 10 and/or the second mirror 20 are mirrors with variable curvatures, which means that the first mirror 10 is a mirror with a variable curvature, or the second mirror 20 is a mirror with a variable curvature, or, both the first mirror 10 and the second mirror 20 are mirrors with variable curvatures.

When the first mirror 10 is a mirror with a variable curvature, the second mirror 20 may be a mirror with a fixed curvature (that is, the curvature of the mirror is fixed, similarly hereinafter). In this case, by changing a curvature radius of the first mirror 10, a focal length of the first mirror 10 is then changed, such that a fine adjustment of a focal length of the overall reflective camera 100 can be achieved, and thus the clear imaging of objects at different distances can be realized. In a similar way, when the second mirror 20 is a mirror with a variable curvature, the first mirror 10 may be a mirror with a fixed curvature. In this case, by changing a curvature radius of the second mirror 20, a focal length of the second mirror 20 is then changed, such that the fine adjustment of the focal length of the overall reflective camera 100 can be achieved, and thus the clear imagining of objects at different distances can be realized. When both the first mirror 10 and the second mirror 20 are mirrors with variable curvatures, by changing the curvature radii of the first mirror 10 and/or the second mirror 20, the focal lengths of the first mirror 10 and/or the second mirror 20 are changed, such that the fine adjustment of the focal length of the overall reflective camera 100 can be achieved, and thus the clear imaging of objects at different distances can be realized. Whether the curvature radius of the first mirror 10 or the curvature radius of the second mirror 20 is changed depends on a required shooting scene. For example, if an ideal imagining effect cannot be achieved by merely changing the curvature radius of the first mirror 10 to change the focal length of the first mirror 10 or by merely changing the curvature radius of the second mirror 20 to change the focal length of the second mirror 20, both the curvature radii of the first mirror 10 and the second mirror 20 can be changed, until the reflective camera 100 achieves the ideal imaging effect.

The mirror with the variable curvature may be a liquid lens. Compared with a conventional lens, the liquid lens can achieve an automatic zoom by changing its own curvature radius, so as to avoid moving the lens to zoom, thus realizing zoom without reserving a movement space for the lens. Therefore, the liquid lens can effectively reduce a total length of the lens and also achieve an automatic zoom function of the lens, which is conducive for the lightweight of the electronic device 1000. The liquid lens may be a graded-index lens, a liquid-filled lens or an electro-wetting-effect lens. The graded-index lens changes a voltage applied to the liquid crystal to adjust the refractive index of the liquid crystal, so as to achieve the zoom. The graded-index lens has advantages of a low control voltage and being easy to array. The liquid-filled lens changes the curvature of the lens surface to zoom by filling and sucking out the liquid. A mechanical device is used to exert a pressure to liquid in a cavity, such that the liquid is redistributed in the cavity to change the curvature radius, thus achieving the zoom. The liquid-filled lens has advantages of a low driving power consumption, a flexible lens aperture size, a shape determined only by mechanical properties of the film and independent of the filled liquid, and a large zoom range. The electro-wetting-effect lens is a liquid lens that controls the wettability of liquid on a solid surface by changing an applied voltage. A change of the wettability of the liquid surface will cause a change of a curvature radius of the electro-wetting-effect lens, thus achieving the zoom. The electro-wetting-effect lens has advantages of a short response time, a wide zoom range, a convenient operation, a good integration performance and a simple structure. In a practical application, the mirror with the variable curvature may choose any one of the graded-index lens, the liquid-filled lens and the electro-wetting-effect lens according to requirements.

Figure 4:
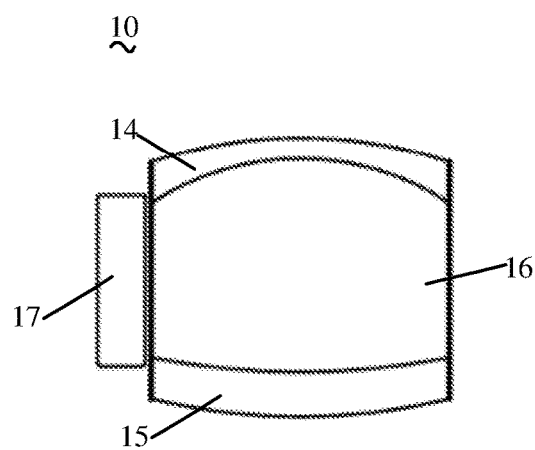
FIG. 4 is a schematic view of a mirror with a variable curvature in a state according to some embodiments of the present disclosure.
Figure 5:
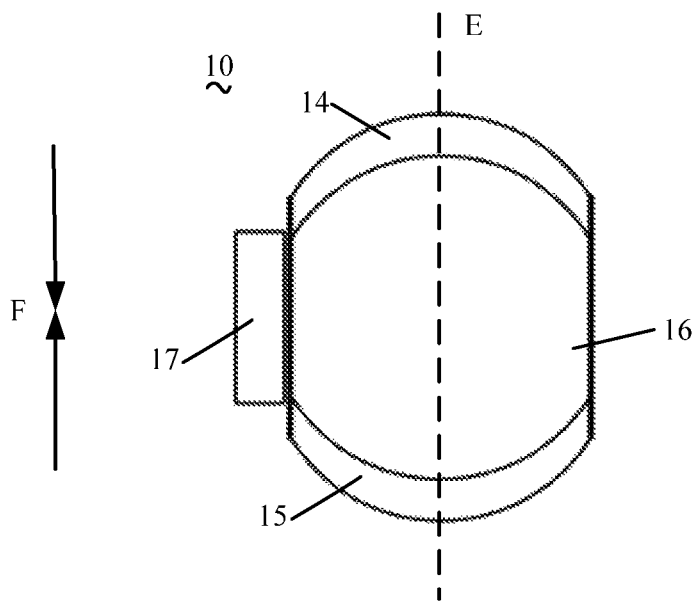
FIG. 5 is a schematic view of a mirror with a variable curvature in another state according to some embodiments of the present disclosure.
Figure 6:
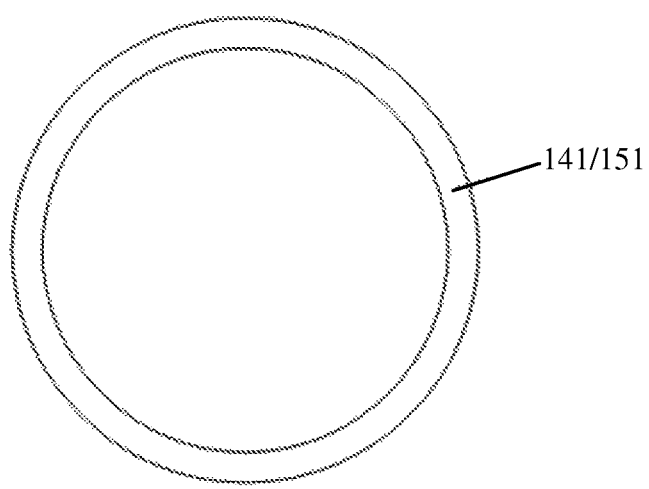
FIG. 6 is a plan view of a mirror with a variable curvature according to some embodiments of the present disclosure.

As illustrated in FIG. 4, when the first mirror 10 is a mirror with a variable curvature (i.e. a liquid lens), and the first mirror 10 includes a first surface 14, a second surface 15, a filler 16 and a control electrode 17. The first surface 14 is the first object-side surface 12 of the first mirror 10, the second surface 15 is the first image-side surface 13 of the first mirror 10, and the first surface 14 faces away from the second surface 15. The filler 16 is arranged between the first surface 14 and the second surface 15. The filler 16 is a liquid, and specifically may be silicon oil, water or alcohol solution, etc. The control electrode 17 is configured to provide a pressure in a predetermined direction to the first surface 14 and the second surface 15 so as to change the curvature of the first mirror 10. The predetermined direction is a direction between the first surface 14 and the second surface 15. It may be understood that when the control electrode 17 is energized, the control electrode 17 provides a pressure F in the predetermined direction to an edge part 141 of the first surface 14 and an edge part 151 of the second surface 15 of the first mirror 10 (as illustrated in FIG. 6). In embodiments of the present disclosure, the predetermined direction is oriented towards a space between the first surface 14 and the second surface 15. For example, the predetermined direction may be parallel to a direction of an optical axis E running through the first mirror 10 (as illustrated in FIG. 5), and oriented towards the space between the first surface 14 and the second surface 15. In other embodiments, the predetermined direction may be not parallel to the direction of the optical axis E running through the first mirror 10, as long as the predetermined direction is oriented towards the space between the first surface 14 and the second surface 15. The control electrode 17 may be mounted to one side of the liquid lens in a direction perpendicular to the optical axis E of the liquid lens (as illustrated in FIG. 5), or to both sides of the liquid lens to ensure that the force applied to the liquid lens is uniform. Since a volume of the filler 16 in the first mirror 10 keeps unchanged, when the edges of the first surface 14 and the second surface 15 are stressed, a surface tension generated will change the surface curvature of the first mirror 10. For example, when the first mirror 10 is adjusted from a convex lens state to a concave lens state, the curvature radius of the first mirror 10 is changed from small to large (the curvature radius may have other change trends, which will not be described in detail herein); or when the first mirror 10 is adjusted from the concave lens state to the convex lens state, the curvature radius of the first mirror 10 is changed from large to small (the curvature radius may have other change trends, which will not be described in detail herein). In addition, a curvature variation Q of the liquid lens is positively related to a force F applied on an edge of the liquid lens. For example, Q=2*F, i.e., the greater the force F applied on the edge of the liquid lens is, the greater the curvature variation Q of the liquid lens becomes. That is, when the liquid lens is adjusted from the concave lens state to the convex lens state, the force F applied on the edge of the liquid lens becomes great, and the protrusion variation of the first surface 14 and the second surface 15 of the first mirror 10 towards outside also becomes great.

Similarly, when the second mirror 20 is a mirror with a variable curvature (i.e. a liquid lens), the structure and working principle of the second mirror 20 are the same with or similar to those of the first mirror 10, which will not be described in detail herein.

The mirror with the variable curvature satisfies a condition formula: f=r/2, wherein f is a focal length of the mirror with the variable curvature, and r is a curvature radius of the mirror with the variable curvature. The reflective camera 100 may focus by changing the focal length f of the mirror with the variable curvature. In some embodiments, if an initial curvature radius of the mirror with the variable curvature is r1, for example, r1=2 mm, an initial focal length of the mirror with the variable curvature is f1=r1/2, i.e., f1=1 mm. The curvature of the mirror with the variable curvature changes, by the control electrode 17 applying the pressure in the predetermined direction to the edge part of the mirror with the variable curvature. For example, when the curvature radius of the mirror with the variable curvature changes to r2, and r2=4 mm, the focal length of the mirror with the variable curvature changes to f2=r2/2, i.e., f2=2 mm. The focal length of the mirror with the variable curvature changes from f1=1 mm to f2=2 mm, so as to achieve the automatic zoom of the reflective camera 100.

Figure 7:
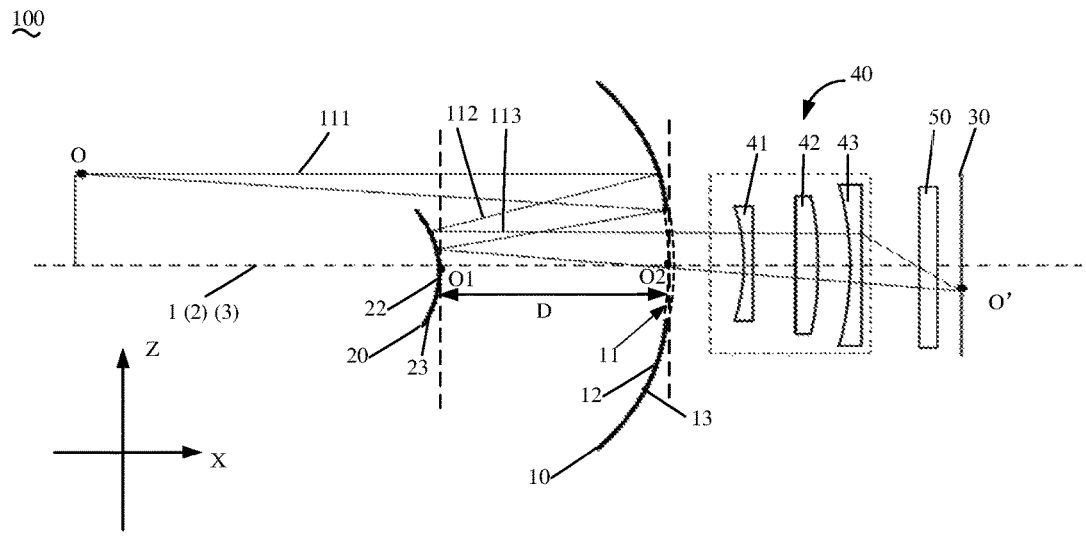
FIG. 7 is a schematic view of a planar light path of a reflective camera according to some embodiments of the present disclosure.

As illustrated in FIG. 7, the reflective camera 100 may further include a transmission module 40. The incident light reflected by the second mirror 20 passes through the through hole 11 and is incident on the transmission module 40, and the transmission module 40 is configured to converge the incident light which is incident after passing through the through hole 11 to the imaging detector 30.

In some embodiments, the first mirror 10 and the second mirror 20 serve as a reflection part of the reflective camera 100. A diameter of the first mirror 10 may be larger than that of the second mirror 20, such that the incident light from the outside may be fully reflected by the first mirror 10. The transmission module 40 and the imaging detector 30 serve as a refraction part of the reflective camera 100. The reflective camera 100 folds the light path through the reflection part, and zooms in or out of the focal length of the reflective camera 100, so as to shorten the total length of the reflective camera 100. Compared with the camera without the first mirror and the second mirror, the focal length of the reflective camera 100 with the first mirror 10 and the second mirror 20 may be increased or decreased by times, such that the reflective camera 100 is miniaturized, easy to mount and satisfies many shooting scene requirements.

The change of the focal lengths of the first mirror 10 and/or the second mirror may increase or decrease the focal length of the transmission module 40, so as to increase or decrease the focal length of the reflective camera 100 (compared with the camera without the first mirror and the second mirror, which is applicable throughout the present disclosure). In some embodiments, the reflective camera 100 satisfies the following condition formula: K=f1/f2, D=|f1−f2|. K is a change ratio of the focal length of the transmission module 40, f1 is a focal length of the first mirror 10, f2 is a focal length of the second mirror 20, and D is a linear distance between centers of two opposite paraboloids of the first mirror 10 and the second mirror 20 (as illustrated in FIG. 7). As illustrated in FIG. 7, D is the linear distance (projected onto the XZ plane) of the centers ($O_1$ and $O_2$ in FIG. 7) of the opposite paraboloids (the paraboloid 23 and the paraboloid 12) of the mirrors with two complete paraboloids (i.e. a missing part of the first mirror 10 in the through hole 11 is complemented, as illustrated in FIG. 7). When both the first mirror 10 and the second mirror 20 are mirrors with variable curvatures, the focal length f1 of the first mirror 10 is related to the curvature radius r1 of the first mirror 10, f1 is proportional to r1, and f1=r1/2. That is, the larger r1 is, the larger f1 is, and the smaller r1 is, the smaller f1 is. For example, when r1=1 mm, f1=0.5 mm; when r1=2 mm, f1=1 mm; when r1=0.1 mm, f1=0.05 mm. Accordingly, the focal length f2 of the second mirror 20 is related to the curvature radius r2 of the second mirror 20, f2 is proportional to r2, and f2=r2/2. That is, the larger r2 is, the larger f2 is, and the smaller r2 is, the smaller f2 is. For example, when r2=1 mm, f2=0.5 mm; when r2=2 mm, f2=1 mm; when r2=0.2 mm, f2=0.1 mm. Since the change ratio K of the focal length of the transmission module 40 is denoted as K=f1/f2, and the linear distance D between the centers of the two opposite paraboloids of the first mirror 10 and the second mirror 20 is denoted as D=|f1−f2|, wherein f1 may be 0.1, 0.12, 0.3, etc., and f2 may be 0.1, 0.22, 0.3, etc. When f1=1 mm and f2=0.5 mm, K=f1/f2=2 and D=|f1−f2|=0.5 mm. That is, when K=2 and D=0.5 mm, the focal length of the reflective camera 100 zooms in to 2 times. When f1=0.4 mm and f2=0.8 mm, K=f1/f2=0.5 and D=|f1−f2|=0.4 mm. That is, when K=0.5 and D=0.4 mm, the focal length of the reflective camera 100 zooms out to 0.5 times. In summary, the focal length of the reflective camera 100 can effectively zoom in or out by adjusting the focal lengths of the first mirror 10 and the second mirror 20, and the above linear distance.

As illustrated in FIG. 3, the transmission module 40 is configured to converge the incident light to the imaging detector 30 for imaging. The transmission module 40 includes one or more lenses. When the transmission module 40 includes one lens, the incident light passes through the lens and converges to the imaging detector 30 for imaging. When the transmission module 40 includes a plurality of lenses, the plurality of lenses may be arranged coaxially, and the incident light passes through the plurality of lenses sequentially and converges to the imaging detector 30 for imaging.

Taking that the transmission module 40 includes three lenses as an example, the transmission module 40 may include a first lens 41, a second lens 42 and a third lens 43 sequentially from the object side to the image side. The incident light reflected from the second mirror 20 passes through the through hole 11 from the object side and enters the transmission module 40, then passes through the first lens 41, the second lens 42 and the third lens 43 sequentially, and finally converges to the imaging detector 30 for imaging.

The focal length of the transmission module 40 may be fixed or the transmission module 40 may zoom. When the transmission module 40 zooms, the imaging detector 30 is fixed, and at least one of the first lens 41, the second lens 42, and the third lens 43 moves, such that at least one of relative positions between any two of the first lens 41, the second lens 42, and the third lens 43 changes to zoom. In addition, the first mirror 10 and the second mirror 20 also function to allow the reflective camera 100 to zoom by times. For example, assuming that an initial focal length f of the transmission module 40 is 1 mm, if the first mirror and the second mirror are not provided, the initial focal length of the camera just is 1 mm. Since the first mirror 10 and the second mirror 20 are provided in the present disclosure, the first mirror 10 and the second mirror 20 increase the focal length of the reflective camera 100 to 1.5 times, such that the initial focal length of the reflective camera is 1.5 mm. When at least one of the first lens 41, the second lens 42 and the third lens 43 moves to change the focal length f of the transmission module 40 into 2 mm, and if the first mirror and the second mirror are not provided, the initial focal length of the camera just is 2 mm. Since the first mirror 10 and the second mirror 20 are provided in the present disclosure, the first mirror 10 and the second mirror 20 increase the focal length of the reflective camera 100 to still 1.5 times, such that the initial focal length of the reflective camera turns into 3 mm. In the embodiments of the present disclosure, the focal length of the transmission module 40 only needs to be finely adjusted, such that a significant increase of the focal length of the reflective camera 100 can be achieved. Thus, the reflective camera 100 has a long focal length and a short total length, thereby facilitating the miniaturization of the reflective camera 100.

When the transmission module 40 zooms, at least one of the first lens 41, the second lens 42, and the third lens 43 moves, which includes following cases: the first lens 41 moves, the second lens 42 and the third lens 43 do not move; the second lens 42 moves, the first lens 41 and the third lens 43 do not move; the third lens 43 moves, the first lens 41 and the second lens 42 do not move; both the first lens 41 and the second lens 42 move, the third lens 43 does not move; both the second lens 42 and the third lens 43 move, the first lens 41 does not move; both the first lens 41 and the third lens 43 move, the second lens 42 does not move; all the first lens 41, the second lens 42 and the third lens 43 do not move; all the first lens 41, the second lens 42, and the third lens 43 move.

The relative positions among the first lens 41, the second lens 42 and the third lens 43 change, and the changes of the relative positions of the lenses herein include changes of distances, displacements, directions and the like of the lenses.

In the embodiments of the present disclosure, the transmission module 40 may be switched between a short-focus state and a long-focus state by zooming. In an embodiment, when the transmission module 40 is being switched between the short focus state and the long focus state, the first lens 41 is fixed, and the second lens 42 and the third lens 43 move so as to change the positions of the second lens 42 and the third lens 43 with respect to the first lens 41. Moving distances of the second lens 42 and the third lens 43 may be different. For example, the moving distance of the second lens 42 is 3.89 mm, the moving distance of the third lens 43 is 3.69 mm. In this case, the moving distance of the second lens 42 is greater than the moving distance of the third lens 43, and the second lens 42 and the third lens 43 may move simultaneously or non-simultaneously. In some embodiments, when the second lens 42 and the third lens 43 move simultaneously, moving speeds of the second lens 42 and the third lens 43 may be different. It may be that the moving speed of the second lens 42 is faster than that of the third lens 43, such that when the second lens 42 and the third lens 43 move simultaneously and have the different moving speeds, moving time of the second lens 42 and the third lens 43 is identical under the condition that the moving distances of the second lens 42 and the third lens 43 are not equal, thus facilitating control thereof. When the second lens 42 and the third lens 43 move non-simultaneously, moving sequential orders of the second lens 42 and the third lens 43 are different. The second lens 42 may move first, then the third lens 32 moves, such that the moving speeds of the second lens 42 and the third lens 43 may be equal under the condition that the moving distances of the second lens 42 and the third lens 43 are not equal, thus also facilitating the control thereof.

In some embodiments, when the transmission module 40 is switched from the short focus state to the long focus state, the second lens 42 and the third lens 43 move from the image side to the object side along the optical axis direction. When the transmission module 40 is switched from the long focus state to the short focus state, the second lens 42 and the third lens 43 move from the object side to the image side along the optical axis direction.

The materials of the first lens 41, the second lens 42, and the third lens 43 may be plastic or glass. The refractive index of glass is larger than that of plastic. The higher the refractive index of the material, the stronger the ability of the material to refract the incident light. Therefore, the higher the refractive index is, the thinner the lens can be configured. Therefore, when the materials of the first lens 41, the second lens 42 and the third lens 43 are glass, the lenses are thin, thus facilitating the miniaturization of the reflective camera 100. In addition, since the lens is made of the glass material, the problem that the temperature drift occurs to the lens when the environment temperature changes can be effectively solved. When the materials of the first lens 41, the second lens 42 and the third lens 43 are plastic, the cost is low, thus facilitating a mass production.

An object-side surface of the first lens 41 is a convex surface, and an image-side surface of the first lens 41 is a convex surface. An object-side surface of the second lens 42 is a concave surface, and an image-side surface of the second lens 42 is a concave surface. An object-side surface of the third lens 43 is a concave surface, and an image-side surface of the third lens 43 is a convex surface. In this case, the first lens 41 has a positive refractive power, and the second lens 42 has a negative refractive power.

When the surface types and the refractive powers of the first lens 41, the second lens 42, and the third lens 43 meet the above conditions, the reflective camera 100 has a compact structure, the shape and size of each lens are convenient to manufacture, and the focal length range is large, the imaging quality is good, and a large-scale mass production is feasible.

In addition, the first lens 41, the second lens 42 and the third lens 43 of the transmission module 40 may be replaced with a first lens group, a second lens group and a third lens group. The first lens group includes one or more lenses, the second lens group also includes one or more lenses, the third lens group also includes one or more lenses. Similarly, by adjusting a position relationship of one or more lens groups, such as changing a distance between the lens groups, the focal length of the transmission module 40 can be changed, thus changing the focal length of the reflective camera 100.

In the embodiments of the present disclosure, as illustrated in FIG. 7, the first mirror 10, the second mirror 20, the transmission module 40 and the imaging detector 30 may be arranged coaxially. In some embodiments, the incident light emitted from the object point O is incident on the first mirror 10 along a first light path 111 and then is reflected by the first mirror 10, the incident light reflected by the first mirror 10 is incident on the second mirror 20 along a second light path 112 and then is reflected by the second mirror 20, and the incident light reflected by the second mirror 20 passes through the through hole 11 along a third light path 113, then goes through the transmission module 40, and finally converges to the imaging detector 30 for imaging, thus resulting in the image point O'. When a central symmetry axis 1 of the first light path 111, a central symmetry axis 2 of the second light path 112 and a central symmetry axis 3 of the third light path 113 coincide, it is called to be arranged coaxially (as illustrated in FIG. 7). It may be understood that when the first mirror 10, the second mirror 20, the transmission module 40 and the imaging detector 30 are arranged coaxially, an internal structural arrangement of the reflective camera 100 is relatively neat and consistent, and an internal structural layout is compact, such that the internal space of the reflective camera 100 can be used to the maximum extent, thus facilitating the miniaturization of the reflective camera 100.

The reflective camera 100 may further include an infrared optical filter 50 arranged between the transmission module 40 and the imaging detector 30, and the infrared optical filter 50 is configured to filter infrared light in the environment.

The imaging detector 30 may be a charge coupled device (CCD) or a complementary metal-oxide semiconductor (CMOS). The light converged to the imaging detector 30 is first processed and then converted into an electrical signal, the electrical signal is converted into a digital signal through an analog-to-digital converter chip (ADC), and the digital signal is processed for imaging.

The working principle of the reflective camera 100 according to the embodiment of the present disclosure is described below with reference to FIG. 8.

Figure 8:
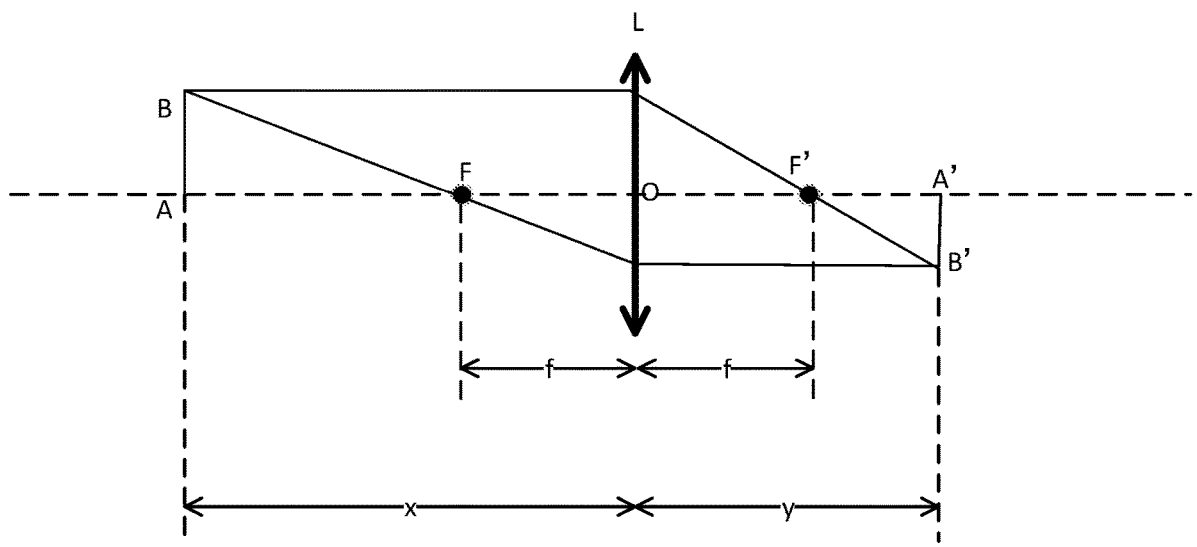
FIG. 8 is a schematic view illustrating an object-image position relationship in an imaging process of a reflective camera according to some embodiments of the present disclosure.

FIG. 8 illustrates a simple lens imaging model. A focal length of a lens unit L is f. With the lens unit L, an object (AB) at a distance x from a main plane of the lens unit L may be imaged into an image (A' B') on the other side of the lens unit L, and a distance between the image (A' B') and the main plane of the lens unit L is y. According to the Gauss imaging formula, the lens unit L satisfies the relational expression: $1/f=1/x+1/y$.

In the formula $1/f=1/x+1/y$, when the object distance x changes, and the focal length f of the lens unit L remains unchanged, the conventional solution may change y through a voice coil motor to satisfy the formula, so as to achieve the automatic zoom. In the present disclosure, when the object distance x changes, y remains unchanged, and f is finely adjusted to satisfy the formula, so as to achieve the automatic zoom. Take common lens and scene as an example, assuming that the focal length f of the lens unit L is 5 mm, the distance x of the object to be shot is 0.5 m, so y is calculated to be 5.050 mm. When the object distance x becomes 1 m, if the voice coil motor is adopted and the focal length f of the lens unit L is kept unchanged, y becomes 5.025 mm. That is, the voice coil motor drives the lens to move by 25 um. When the solution of the mirror with the variable curvature in the present disclosure is adopted, y keeps unchanged, and the focal length f is calculated to be 5.025 mm. That is, a variation amount $\Delta f$ of the focal length is 25 um. It may be seen that, in principle, clear imagining of objects at different distances can be achieved by adjusting the distance y between the lens unit L and the imaging detector 30 or finely adjusting the overall focal length f of the lens unit L. The function of slightly changing the focal length f of the lens unit L is called focusing. The difference between the focusing and the zoom of the lens unit L is that the zoom means a wide range change of the focal length, such as from 5 mm to 10 mm, while the focusing means a slight change of the focal length. The conventional autofocus solution uses the voice coil motor to move the lens unit L forward and backward, such that a volume and a weight of the camera are relatively large, thus not facilitating the miniaturization as well as the lightness and thinness of the camera. The auto-focus solution in the embodiment of the present disclosure adopts the manner of changing the focal length f, so as to effectively avoid adding the voice coil motor and reserving the moving space for the lens unit L, thus reducing the volume and the weight of the camera, and hence facilitating the miniaturization as well as the lightness and thinness of the camera.

In the embodiment of the present disclosure, the reflective camera 100 includes a first mirror 10 (an annular structure with a through hole 11 in center), a second mirror 20 and a transmission module 40. The first mirror 10, the second mirror 20 and the transmission module 40 together form a lens unit L. The reflective camera 100 further includes an infrared optical filter 50 and an imaging detector 30. The light emitted from the object side is reflected to the second mirror 20 by the first mirror 10. After being reflected by the second mirror 20, the light passes through the through hole 11 of the first mirror 10, then passes through the transmission module 40, and converges on the imaging detector 30 for imaging.

The first mirror 10, the second mirror 20 and the transmission module 40 together form the lens unit L. Assuming that a plurality of lenses in the lens unit L is f1, f2, . . . fn, respectively, and the focal length of the lens unit including the first mirror 10, the second mirror 20 and the transmission module 40 is f, so the focal length of each lens contributes to the focal length f of the final lens unit L. Therefore, the fine adjustment of the focal length f of the overall lens unit L can be achieved by changing the focal length of a single lens.

The first mirror 10 and/or the second mirror 20 of the reflective camera 100 according to the embodiment of the present disclosure are mirrors with variable curvatures (liquid lenses). That is, the first mirror 10 of the reflective camera 100 is the mirror with the variable curvature, or the second mirror 20 of the reflective camera 100 is the mirror with the variable curvature, or both the first mirror 10 and the second mirror 20 of the reflective camera 100 are the mirrors with the variable curvatures. For the mirror with the variable curvature, the focal length satisfies the following formula: $f=r/2$, in which f is the focal length of the mirror with the variable curvature, and r is the curvature radius of the mirror with the variable curvature. According to the formula $f=r/2$, the focal length f of the mirror with the variable curvature can be changed by changing r (i.e. the curvature radius) of the mirror with the variable curvature. When the first mirror 10 is the mirror with the variable curvature, the focal length f1 of the first mirror 10 can be changed by changing the curvature radius r1 of the first mirror 10, and then the fine adjustment of the focal length f of the overall lens unit L can be achieved by changing the focal length f1 of the first mirror 10. When the second mirror 20 is the mirror with the variable curvature, the focal length f2 of the second mirror 20 can be changed by changing the curvature radius r1 of the second mirror 20, and then the fine adjustment of the focal length f of the overall lens unit L can be achieved by changing the focal length f2 of the second mirror 20. When both the first mirror 10 and the second mirror 20 are the mirrors with the variable curvatures, the focal length f1 of the first mirror 10 can be changed by changing the curvature radius r1 of the first mirror 10, and the focal length f2 of the second mirror 20 can be changed by changing the curvature radius r1 of the second mirror 20, such that the fine adjustment of the focal length f of the overall lens unit L can be achieved by changing the focal length f1 of the first mirror 10 and/or the focal length f2 of the second mirror 20. The reflective camera 100 according to the embodiment of the present disclosure may change only the focal length f1 of the first mirror 10 to achieve the fine adjustment of the focal length f of the overall lens unit L, or change only the focal length f2 of the second mirror 20 to achieve the fine adjustment of the focal length f of the overall lens unit L, or change both the focal length f1 of the first mirror 10 and the focal length f2 of the second mirror 20 to achieve the fine adjustment of the focal length f of the overall lens unit L.

In summary, when the reflective camera 100 according to the embodiment of the present disclosure shoots scenes at different distances, the curvature radii of the first mirror 10 and/or the second mirror 20 can be changed under the drive of the control electrode 17 in the mirror with the variable curvature, and then the focal lengths of the first mirror 10 and/or the second mirror 20 are changed so as to change the focal length of the reflective camera 100, such that the reflective camera 100 can achieve the auto focus with a relative small total length, thereby realizing the clear imaging of the reflective camera 100 as well as the lightness and thinness of the electronic device 1000.

Reference throughout this specification to terms "certain embodiments" "an embodiment," "some embodiments," "an example embodiment," "an example", "a specific example," or "some examples," means that a particular feature, structure, material, or characteristic described in connection with the embodiment or example is included in at least one embodiment or example of the present disclosure. In this specification, example descriptions of aforesaid terms are not necessarily referring to the same embodiment or example. Moreover, the particular features, structures, materials, or characteristics described may be combined in any suitable manner in one or more embodiments or examples. Furthermore, in the case of non-contradiction, those skilled in the art may combine and group the different embodiments or examples described in this specification and the features of the different embodiments or examples.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means at least two, such as two, three and so on, unless specified otherwise.

Although explanatory embodiments have been illustrated and described, it would be appreciated by those skilled in the art that the above embodiments are examples and cannot be construed to limit the present disclosure, and changes, modifications, alternatives and varieties can be made in the embodiments by those skilled in the art within the scope of the present disclosure. The scope of this disclosure is limited by the claims and their equivalents.

What is claimed is:

1. A reflective camera, comprising:
   a first mirror provided with a through hole and configured to reflect an incident light;
   a second mirror arranged on a first side of the first mirror, and configured to reflect the incident light reflected by the first mirror; and
   an imaging detector arranged on a second side of the first mirror, and configured to receive the incident light reflected by the second mirror through the through hole, and further to convert the incident light into an electrical signal for imaging,
   wherein at least one of the first mirror or the second mirror is a mirror with a variable curvature,
   wherein the first mirror or the second mirror with the variable curvature is a liquid lens, and
   wherein the liquid lens comprises:
      a first surface;
      a second surface facing away from the first surface;
      a filler arranged between the first surface and the second surface; and
      a control electrode arranged to a side of the liquid lens in a direction perpendicular to an optical axis of the liquid lens, and configured to provide a pressure in a predetermined direction to the first surface and the second surface, wherein the predetermined direction is a direction oriented towards a space between the first surface and the second surface.

2. The reflective camera according to claim 1, further comprising a transmission module,
   wherein the transmission module is configured to receive the incident light reflected by the second mirror through the through hole, and further to converge the incident light to the imaging detector.

3. The reflective camera according to claim 2, wherein the second mirror, the first mirror, the transmission module and the imaging detector are arranged coaxially.

4. The reflective camera according to claim 1, wherein the control electrode is configured to provide the pressure in the predetermined direction to an edge part of the first surface and an edge part of the second surface of the first mirror.

5. The reflective camera according to claim 1, wherein the mirror with the variable curvature satisfies a condition formula:

$$f=r/2,$$

wherein f is a focal length of the mirror with the variable curvature, r is a curvature radius of the mirror with the variable curvature; and the reflective camera is configured to focus by changing the focal length f of the mirror with the variable curvature.

6. The reflective camera according to claim 5, wherein the focal length f of the mirror with the variable curvature is configured to be changed by changing the curvature radius of the mirror.

7. The reflective camera according to claim 1, wherein the second mirror is arranged on an object side of the first mirror, and the imaging detector is arranged on an image side of the first mirror.

8. The reflective camera according to claim 1, wherein the first mirror comprises a first object-side surface and a first image-side surface facing away from each other, the second mirror comprises a second object-side surface and a second image-side surface facing away from each other, the first object-side surface is opposite to the second image-side surface, the first object-side surface is configured to reflect the incident light, and the second image-side surface is configured to reflect the incident light reflected by the first object-side surface.

9. The reflective camera according to claim 8, wherein the first object-side surface is one of a paraboloid, a spherical surface, an ellipsoid or a hyperboloid.

10. The reflective camera according to claim 8, wherein the second image-side surface is one of a paraboloid, a spherical surface, an ellipsoid or a hyperboloid.

11. The reflective camera according to claim 8, wherein the first object-side surface is one of a paraboloid, a spherical surface, an ellipsoid or a hyperboloid; and
    the second image-side surface is one of a paraboloid, a spherical surface, an ellipsoid or a hyperboloid.

12. The reflective camera according to claim 8, wherein the first object-side surface is a concave surface, and the second image-side surface is a convex surface.

13. The reflective camera according to claim 2, wherein the transmission module comprises at least one lens arranged coaxially.

14. The reflective camera according to claim 2, further comprising an infrared optical filter arranged between the transmission module and the imaging detector, and configured to filter infrared light in an environment.

15. An electronic device, comprising:
    a housing; and
    a reflective camera joined with the housing, the reflective camera comprising:
       a first mirror provided with a through hole and configured to reflect an incident light;
       a second mirror arranged on a first side of the first mirror, and configured to reflect the incident light reflected by the first mirror; and
       an imaging detector arranged on a second side of the first mirror, and configured to receive the incident light reflected by the second mirror through the through hole, and further to convert the incident light into an electrical signal for imaging,
       wherein at least one of the first mirror or the second mirror is a mirror with a variable curvature,
       wherein the first mirror or the second mirror with the variable curvature is a liquid lens, and
       wherein the liquid lens comprises:
          a first surface;
          a second surface facing away from the first surface;

a filler arranged between the first surface and the second surface; and a control electrode arranged to a side of the liquid lens in a direction perpendicular to an optical axis of the liquid lens, and configured to provide a pressure in a predetermined direction to the first surface and the second surface, wherein the predetermined direction is a direction oriented towards a space between the first surface and the second surface.

16. The electronic device according to claim 15, wherein the housing comprises:

a main body; and a movable bracket configured to slide into or out of the main body, the reflective camera being mounted to the movable bracket.

17. A reflective camera, comprising:

a first mirror provided with a through hole and having a concave object-side surface;

a second mirror arranged on an object side of the first mirror, and having a convex image-side surface opposite to the concave object-side surface of the first mirror; and an imaging detector arranged on an image side of the first mirror, and configured to receive an incident light reflected by the first mirror and the second mirror via the through hole, and further to convert the incident light into an electrical signal for imaging, wherein the reflective camera is configured to focus by changing a focal length of at least one of the first mirror and the second mirror, wherein at least one of the first mirror or the second mirror is a mirror with a variable curvature, wherein the first mirror or the second mirror with the variable curvature is a liquid lens, wherein the liquid lens comprises:

a first surface;

a second surface facing away from the first surface;

a filler arranged between the first surface and the second surface; and a control electrode arranged to a side of the liquid lens in a direction perpendicular to an optical axis of the liquid lens, and configured to provide a pressure in a predetermined direction to the first surface and the second surface, wherein the predetermined direction is a direction oriented towards a space between the first surface and the second surface.

* * * * *